United States Patent [19]

Van Englehoven

[11] 3,857,032

[45] Dec. 24, 1974

[54] OPTICAL COURSE DATUM HEADING SELECTION TRANSDUCER

[75] Inventor: Clarence Van Englehoven, Olathe, Kans.

[73] Assignee: King Radio Corporation, Olathe, Kans.

[22] Filed: Mar. 28, 1973

[21] Appl. No.: 345,487

[52] U.S. Cl............. 250/231 R, 250/229, 244/77 R
[51] Int. Cl. .............................................. G01d 5/34
[58] Field of Search.... 250/203 R, 202, 210, 231 R, 250/229; 244/77 R

[56] References Cited
UNITED STATES PATENTS

| 2,361,973 | 11/1944 | Smith | 250/203 X |
| 2,648,249 | 8/1953 | Canada | 250/232 X |
| 2,939,128 | 5/1960 | Arkus | 250/210 X |
| 3,465,221 | 9/1969 | Arce et al. | 244/77 R |
| 3,752,997 | 8/1973 | MacKenzie et al. | 250/229 X |

Primary Examiner—Walter Stolwein
Attorney, Agent, or Firm—Lowe, Kokjer, Kircher, Wharton & Bowman

[57] ABSTRACT

An optical transducer in an avionics system which includes a compass card for indicating aircraft heading has a disc with a cam surface thereon that is rotated by a shaft connected compass card. When a pilot rotates the heading select indicator associated with the compass card to a new heading, the cam surface pivots a shutter in an appropriate direction. A pair of photoresistors are located in a bridge circuit and are equally illuminated by a corresponding light source when the heading select indicator and the aircraft lubber line coincide thereby effecting a predetermined output from the bridge circuit. Shutter movement, due to a heading or course change, causes either one or the other of the two resistors to have a more or less light impinging thereon thereby producing a bridge error signal. The error signal output may then be used by a flight director or auto pilot to maneuver the aircraft to the newly selected heading. Once the heading select indicator and the aircraft lubber line are aligned, the shutter is re-located so that the photoresistors are again in balance and no error signal output emanates from the bridge circuit.

3 Claims, 2 Drawing Figures

OPTICAL COURSE DATUM HEADING SELECTION TRANSDUCER

BACKGROUND AND BRIEF DESCRIPTION OF THE INVENTION

The problem of electrically obtaining course selection information for an auto pilot or flight directors has been solved mainly by the use of a potentiometer or synchro. When the pilot selects a heading or a course, either the potentiometer arrangement produces an error signal or the rotor of the synchro will produce the resultant error signal. In any event, this error signal will be fed to a flight director or auto pilot, in turn producing a signal to effect the maneuvering of the aircraft to correspond with the selected heading or course. The effective maneuvering reduces the error signal to zero until the aircraft varies from the preselected course. Both the potentiometer and synchro methods have the disadvantages of mechanical wear and are, at the present time, high cost items that make such a system quite expensive for small general aviation aircraft owners.

The instant invention relates to an optical method and apparatus for achieving an appropriate AC or DC output to be utilized with the flight directors and/or auto pilots. The circuit will include an AC (or DC) excitation signal being applied to a bridge circuit having two fixed resistors and two variable photoresistors therein. An output will be obtained from the bridge with the same passing through a differential power amplifier before being transmitted to the associated flight director or auto pilot. A rotating disc (with the heading select indicator connected thereto) will be mechanically linked to an aircraft's compass card with the rotating disc having a cam surface contacting a pivotally mounted shutter mechanism. The motion of the shutter is such that each one of the photoresistors is partially covered from a light source balancing the bridge with a no error signal output when the lubber line of the aircraft corresponds with the selected heading of the compass card. When a pilot selects a new heading or course, the movement of the heading select indicator rotates the associated disc and cam surface through the linkage so that the shutter is pivoted in a direction to expose one of the two photoresistors to more light than the other. This exposure changes the resistance in the bridge, upsets the balance and produces an error signal which is amplified through the differential power amplifier and eventually used to initiate the corrective operation of either the auto pilot or the necessary signalling for operation of flight director systems.

One of the primary objects of the invention is to provide a uniquely constructed course datum heading selection transducer for specific use in avionics equipment which includes an optical technique in developing an AC or DC error signal output.

Another object of the invention is to provide a transducer of the character described which is inexpensive to manufacture and which is long-lived in comparison with known prior art techniques. It is a feature of this object that the time for replacement and repair of the transducer has been significantly reduced due to the elimination of mechanical wear normally associated with potentiometers and synchro mechanisms.

A further object of the invention is to provide a uniquely constructed course datum heading selection transducer utilized in avionics systems which includes a novel arrangement or photoresistors and a pivotal shutter to produce an error signal indicative of certain corrective maneuvers required by an aircraft using said system.

A still further object of this invention is to provide an optical transducer for avionics equipment which utilizes an inexpensive bridge circuit and shutter mechanism to determine the necessary corrective maneuvers that an aircraft must make to align the lubber line of said aircraft with a newly selected course or heading. It is a feature of this object that the bridge circuit automatically helps compensate for changes in components due to temperature and further that the component parameters have less effect on the system accuracy as compared to known prior art devices.

These and other objects of the invention, together with the features of novelty appurtenant thereto, will appear in the course of the following description.

DETAILED DESCRIPTION OF THE INVENTION

Figure 1:
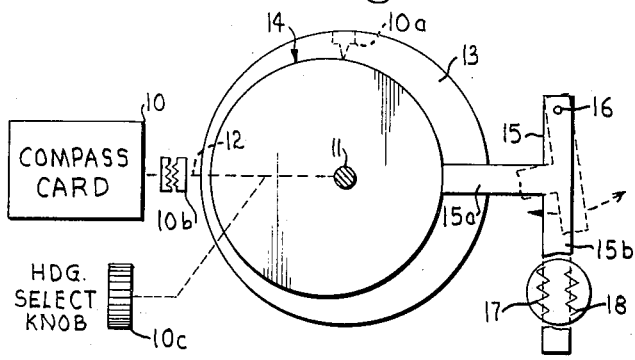
Figure 2:
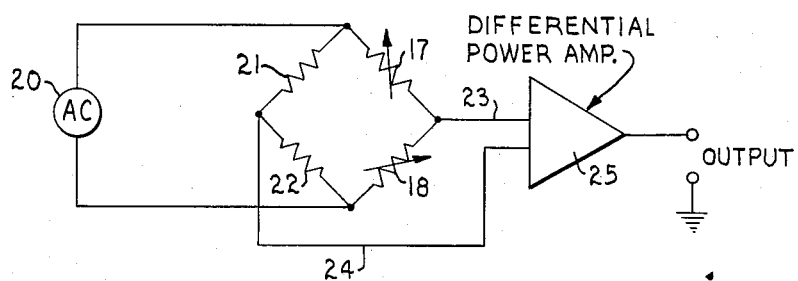

In the accompanying drawings which form a part of this specification and are to be read in conjunction therewith and in which like reference numerals are employed to indicate like parts in various views:

FIG. 1 is a schematic diagram of the compass card, rotatable cam surface with associated heading select indicator and knob, pivotal shutter and photoresistor pair; and FIG. 2 is a schematic diagram of the bridge circuit with the photoresistors shown therein and with the output of the bridge circuit being amplified through a differential power amplifier.

Turning now more particularly to the drawings, the reference numeral 10 in FIG. 1 diagrammatically represents the compass card and is shown as being mechanically linked with the rotatable shaft 11 by the linkage 12. It should be understood that the linkage 12 could possibly include various types of gears or clutches and that the important consideration is that when the heading select indicator 10a is rotated by the pilot to a new heading or course, linkage 12 will cause the shaft 11 to likewise rotate a corresponding angular distance and direction. As shown, slip clutch 10b and the heading select knob 10c form a portion of the linkage so that the heading select indicator 10a may be rotated without moving compass card 10.

The rotatable shaft 11 will have a disc 13 mounted thereon with a cam surface 14 movable therewith. This structure essentially forms an eccentric so that disc rotation via shaft 11 will significantly change the location of the cam surface relative to the periphery of disc 13.

A shutter 15 is pivotally mounted at 16 and has a cam riding leg 15a extending into contact with cam surface 14. The shutter leg 15b is substantially normal to the leg 15a and is located between a light source (usually a light emitting diode not shown) and a pair of photoresistors hereinafter identified by the numerals 17 and 18. With the shutter in the solid line position shown in FIG. 1, the photoresistors are equally and partially covered by same. In other words, the light impinging on each of the photoresistors 17 and 18 from the light source will be equally substantially divided between the two photoresistors. As the cam surface 14 rotates, the shutter will pivot about point 16 (as indicated by the broken lines) to effectively change the resistance of either one of the two photoresistors 17 and 18 depending upon the direction and movement of the shutter. As will be seen, this resistance change results in a production of an error signal which may correspondingly be used to initiate auto pilot or flight director action.

The schematic diagram in FIG. 2 details a bridge arrangement that is utilized with the optical transducer. For instance, the circuitry associated with the two photoresistors 17 and 18 will include an excitation AC signal source 20. One of the features of this invention is that a DC source excitation may also be used thereby providing considerable versatility in installation since the transducer is not limited to one form of excitation and not the other. In any event, the bridge is comprised of the two photoresistors 17 and 18 along with a pair of fixed resistors 21 and 22. The output from the bridge is taken between the two variable photoresistors by line 23 and between the two fixed resistors shown at line 24.

As suggested above, the output from the light emitting diode or light source that impinges light on at least a portion of both of the resistors 17 and 18 is modulated by means of the opaque shutter portion 15b. For example, if the shutter portion 15b moves to the broken line position shown in FIG. 1, the photoresistor 17 will receive more light thereby lowering the resistance of resistor 17 and simultaneously increasing the resistance of resistor 18. This results in line 23 approaching the potential near the upper portion of the bridge and, since the two fixed resistors form a center tap, these signals may vary from the center to either the upper or lower end of the bridge excitation potential. This variance essentially forms the error signal appearing on the output lines 23 and 24 and is indicative of the angular rotation of shaft 11 which directly corresponds to the angular rotation of the compass card 10. The differential power amplifier 25 includes an output signal of sufficient magnitude and power to operate effectively with either an auto pilot or a flight director. In any event, the output signal, if displayed on the flight director, results in a visual indication of which direction to bank the aircraft to achieve a turn so that the lubber line of the aircraft will coincide with the selected course or heading. Likewise, an auto pilot utilizing the signal output will move the surfaces of the aircraft in such a way to bring it into the desired direction.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an avionics system having a compass card and a manually movable heading select indicator therein, the improvement comprising
   a shutter,
   a light source,
   a light sensitive detector, said detector having an electrical signal output therefrom,
   a cam surface operatively coupled to said compass card said surface contacting said shutter,
   means for moving said cam surface in accordance with the relative angular positions of said heading select indicator and said compass card, and
   means for movably mounting and locating said shutter between said light source and said light sensitive detector to thereby preclude at least a portion of said light from impinging on said detector when said shutter occupies a preselected position, said detector signal output corresponding to the angular position of said heading select indicator with respect to said compass card.

2. The combination as in claim 1 wherein said system includes a bridge circuit, said detector being located within said bridge circuit and operable to effect a bridge circuit output correlated to the angular movement of said heading select indicator when said shutter variably impedes the illumination of said light sensitive detector.

3. The combination as in claim 2 wherein said bridge circuit includes at least two light sensitive detectors, said shutter being positionable so that an amount of light from said light source impinges upon each of said light sensitive detectors to effect the balancing of said bridge circuit, said shutter operable to be moved in accordance with the movement of said heading select indicator to permit more light to impinge upon one detector than on the other, said bridge circuit thereby having an error signal output corresponding to said indicator movement.

* * * * *